United States Patent
Chen (10) Patent No.: US 10,114,471 B2
(45) Date of Patent: Oct. 30, 2018

(54) WIRELESS INPUT SYSTEM BASED ON AN INTRA-BODY COMMUNICATION AND IMPLEMENTATION METHOD THEREOF

(71) Applicant: HUIZHOU TCL MOBILE COMMUNICATION CO., LTD., Guangdong (CN)

(72) Inventor: Xiling Chen, Guangdong (CN)

(73) Assignee: HUIZHOU TCL MOBILE COMMUNICATION CO., LTD., Guangdong (CN)

(*) Notice: Subject to any disclaimer, the term of this patent is extended or adjusted under 35 U.S.C. 154(b) by 8 days.

(21) Appl. No.: 15/308,082

(22) PCT Filed: Apr. 7, 2016

(86) PCT No.: PCT/CN2016/078642
§ 371 (c)(1),
(2) Date: Oct. 31, 2016

(87) PCT Pub. No.: WO2017/005024
PCT Pub. Date: Jan. 12, 2017

(65) Prior Publication Data
US 2017/0262068 A1    Sep. 14, 2017

(30) Foreign Application Priority Data
Jul. 9, 2015   (CN) .......................... 2015 1 0399646

(51) Int. Cl.
*G06F 11/16*     (2006.01)
*G06F 3/02*     (2006.01)
(Continued)

(52) U.S. Cl.
CPC ............ *G06F 3/0231* (2013.01); *G06F 1/163* (2013.01); *G06F 1/1698* (2013.01); *G06F 3/011* (2013.01); *H04B 13/005* (2013.01)

(58) Field of Classification Search
CPC ....................................................... G06F 1/163
See application file for complete search history.

(56) References Cited

U.S. PATENT DOCUMENTS

| 2004/0027385 A1* | 2/2004 | Rekimoto ............... G06F 1/163 715/773 |
| 2012/0169604 A1* | 7/2012 | Chen ..................... G06F 3/0233 345/168 |
| 2013/0315069 A1 | 11/2013 | Douglas |

FOREIGN PATENT DOCUMENTS

| CN | 1457456 | 11/2003 |
| CN | 103944649 | 7/2014 |
(Continued)

OTHER PUBLICATIONS

English abstract of CN 105005382.
(Continued)

*Primary Examiner* — Sanghyuk Park
(74) *Attorney, Agent, or Firm* — WPAT, PC (57) ABSTRACT

A wireless input system based on an intra-body communication and an implementation method thereof are provided. The method includes detecting, by a wireless keyboard, that a user clicks a plurality of keys of a keyboard and recording a keying code information corresponding to the keys; transmitting the recorded keying code information via an intra-body communication; receiving, by an intelligent wearable device, the keying code information; and mapping the received keying code information to a simulated keyboard keying code information and starting a searching mode of a default input method to search corresponding text messages for input. The present invention improves the input efficiency of the intelligent wearable device.

12 Claims, 2 Drawing Sheets

(51) Int. Cl.
*G06F 3/023* (2006.01)
*G06F 1/16* (2006.01)
*G06F 3/01* (2006.01)
*H04B 13/00* (2006.01)

(56) References Cited

FOREIGN PATENT DOCUMENTS

| | | |
|---|---|---|
| CN | 104573476 | 4/2015 |
| CN | 105005382 | 10/2015 |

OTHER PUBLICATIONS

English abstract of CN 1457456.
English abstract of CN 103944649.
English abstract of CN104573476.

\* cited by examiner

WIRELESS INPUT SYSTEM BASED ON AN INTRA-BODY COMMUNICATION AND IMPLEMENTATION METHOD THEREOF

CROSS REFERENCE TO RELATED APPLICATION

This application claims the priority of International Application No. PCT/CN2016/078642, filed on Apr. 7, 2016, which claims priority to Chinese Application No. 201510399646.6, filed on Jul. 9, 2015. The entire disclosures of each of the above applications are incorporated herein by reference.

BACKGROUND OF THE INVENTION

Field of Invention

The present invention relates to a technical field of an intra-body communication, and more particularly to a wireless input system based on an intra-body communication and implementation method thereof.

Description of Prior Art

With the rapid development of wearable devices, intelligent wearable devices become more widely available and the screens of the intelligent wearable devices will be continuously shrunk. In some application situations which are required to input text messages such as a scene-chatting function, a scene-searching function and a text-recording scene, the operations on the screens of the wearable devices are difficult to be performed. Conventionally, there are two methods to input messages on the small screen of the wearable devices. One method is a speech recognition input manner and the other method is to input message by a small keyboard on the small screen. However, the speech recognition of the conventional intelligent wearable device, such as Apple Watch, cannot be precisely made since the input method is not optimal.

Consequently, there is a need to improve the conventional technique and develop a novel system.

SUMMARY OF THE INVENTION

Based on the above-mentioned drawbacks of an input method of a small screen in a conventional intelligent wearable device, one objective of the present invention is to provide a wireless input system based on an intra-body communication and implementation method thereof to improve the input efficiency of the intelligent wearable device (e.g., an intelligent watch) equipped with a small screen to increase the convenience of the users where the wireless input system has a simple structure, a convenient operation, and a better security.

For the above-mentioned objective, the present invention employs the following technical schemes.

A wireless input system based on an intra-body communication includes an intelligent wearable device wherein the wireless input system based on the intra-body communication further includes a wireless keyboard coupled to the intelligent wearable device by a wireless manner to receive an input information, wherein the wireless keyboard includes an intra-body communication unit of a transmitting terminal and the intelligent wearable device includes an intra-body communication unit of a receiving terminal so that the wireless keyboard communicates with the intelligent wearable device therebetween via a human body to perform a wireless input procedure, and wherein the intra-body communication unit of the transmitting terminal is disposed in a press-button position of the wireless keyboard to directly contact a typing finger of a user, and the intra-body communication unit of the receiving terminal is disposed in the intelligent wearable device to directly contact a skin surface of the human body of the user;

the wireless keyboard further including a control unit of the transmitting terminal and a storage unit;

wherein the control unit of the transmitting terminal coupled to the intra-body communication unit of the transmitting terminal controls operations of the units within the wireless keyboard;

wherein the storage unit coupled to the control unit of the transmitting terminal stores a type information of the wireless keyboard and dynamically stores a keying code information, and the storage unit further includes a keying code information storage unit for dynamically stores and records the keying code information; and the intelligent wearable device further including a control unit of the transmitting terminal and a display unit;

wherein the control unit of the receiving terminal coupled to the intra-body communication unit of the receiving terminal controls operations of the units within the intelligent wearable device; and wherein the display unit coupled to the control unit of the receiving terminal displays text messages on a screen of the intelligent wearable device.

In one embodiment of the wireless input system based on the intra-body communication, the wireless keyboard further includes a click-detecting unit, a recording and storing keying code unit, and a reading and transmitting unit;

wherein the click-detecting unit coupled to the control unit of the transmitting unit is configured to detect whether the user clicks the wireless keyboard by the hand;

wherein the recording and storing keying code unit coupled to the control unit of the transmitting unit is configured to record and store the clicked keying code information when the user clicks the wireless keyboard by the hand; and wherein the reading and transmitting unit coupled to the control unit of the transmitting unit is configured to read the keying code information and transmits the keying code information and the keyboard type information of the wireless keyboard.

In one embodiment of the wireless input system based on the intra-body communication, the intelligent wearable device further includes a receiving and determining unit, a determination unit, an input method unit, and a searching and input unit;

wherein the receiving and determining unit coupled to the control unit of the receiving terminal is configured to receive and analyze the keying code information and the keyboard type information issued by the wireless keyboard and determines whether the analyzed keyboard type information corresponds to the wireless keyboard clicked by the user;

wherein the determination unit coupled to the control unit of the receiving terminal is configured to determine whether the intelligent wearable device is in an input status when the keyboard type information corresponds to the wireless board clicked by the user;

wherein the input method unit coupled to the control unit of the receiving terminal is configured to acquire the keying code information and maps the acquired keying code information to a simulated keying code information when the intelligent wearable device is in the input status; and wherein the searching and input unit coupled to the control unit of the receiving terminal is configured to start an input method mode of the intelligent wearable device based on the simulated keyboard keying code information to search the corresponding text messages for input.

A wireless input system based on an intra-body communication includes an intelligent wearable device wherein the wireless input system based on the intra-body communication further includes a wireless keyboard coupled to the intelligent wearable device by a wireless manner to receive an input information, wherein the wireless keyboard includes an intra-body communication unit of a transmitting terminal and the intelligent wearable device includes an intra-body communication unit of a receiving terminal so that the wireless keyboard communicates with the intelligent wearable device therebetween via a human body to perform a wireless input procedure;

the wireless keyboard further including a control unit of the transmitting terminal and a storage unit;

wherein the control unit of the transmitting terminal coupled to the intra-body communication unit of the transmitting terminal controls operations of the units within the wireless keyboard;

wherein the storage unit coupled to the control unit of the transmitting terminal stores a type information of the wireless keyboard and dynamically stores a keying code information; and the intelligent wearable device further including a control unit of the transmitting terminal and a display unit;

wherein the control unit of the receiving terminal coupled to the intra-body communication unit of the receiving terminal controls operations of the units within the intelligent wearable device; and wherein the display unit coupled to the control unit of the receiving terminal displays text messages on a screen of the intelligent wearable device.

In one embodiment of the wireless input system based on the intra-body communication, the wireless keyboard further includes a click-detecting unit, a recording and storing keying code unit, and a reading and transmitting unit;

wherein the click-detecting unit coupled to the control unit of the transmitting unit is configured to detect whether the user clicks the wireless keyboard by the hand;

wherein the recording and storing keying code unit coupled to the control unit of the transmitting unit is configured to record and store the clicked keying code information when the user clicks the wireless keyboard by the hand; and wherein the reading and transmitting unit coupled to the control unit of the transmitting unit is configured to read the keying code information and transmits the keying code information and the keyboard type information of the wireless keyboard.

In one embodiment of the wireless input system based on the intra-body communication, the intelligent wearable device further includes a receiving and determining unit, a determination unit, an input method unit, and a searching and input unit;

wherein the receiving and determining unit coupled to the control unit of the receiving terminal is configured to receive and analyze the keying code information and the keyboard type information issued by the wireless keyboard and determines whether the analyzed keyboard type information corresponds to the wireless keyboard clicked by the user;

wherein the determination unit coupled to the control unit of the receiving terminal is configured to determine whether the intelligent wearable device is in an input status when the keyboard type information corresponds to the wireless board clicked by the user;

wherein the input method unit coupled to the control unit of the receiving terminal is configured to acquire the keying code information and maps the acquired keying code information to a simulated keying code information when the intelligent wearable device is in the input status; and wherein the searching and input unit coupled to the control unit of the receiving terminal is configured to start an input method mode of the intelligent wearable device based on the simulated keyboard keying code information to search the corresponding text messages for input.

In one embodiment of the wireless input system based on the intra-body communication, the intra-body communication unit of the transmitting terminal is disposed in a press-button position of the wireless keyboard to directly contact a typing finger of a user, and the intra-body communication unit of the receiving terminal is disposed in the intelligent wearable device to directly contact a skin surface of the human body of the user.

In one embodiment of the wireless input system based on the intra-body communication, the storage unit further includes a keying code information storage unit for dynamically stores and records the keying code information.

An implementation method of a wireless input system based on an intra-body communication includes:

detecting, by a wireless keyboard, that a user clicks a plurality of keys of a keyboard to perform an input operation and recording a keying code information corresponding to the keys;

transmitting, by the wireless keyboard, the recorded keying code information via an intra-body communication using an intra-body communication unit of a transmitting terminal;

receiving, by the intelligent wearable device, the keying code information transmitted from the intra-body communication using the intra-body communication unit of a receiving terminal; and mapping, by the intelligent wearable device, the received keying code information to a simulated keyboard keying code information and starting a searching mode of a default input method to search corresponding text messages for input.

In one embodiment of the implementation method of the wireless input system based on the intra-body communication, detecting, by the wireless keyboard, that the user clicks the keys of the keyboard to perform the input operation and recording the keying code information corresponding to the keys further includes:

detecting, by the wireless keyboard, that the user clicks the keys of the keyboard and directly contacting, by fingers of the user, the keys of the wireless keyboard.

In one embodiment of the implementation method of the wireless input system based on the intra-body communication, transmitting, by the wireless keyboard, the recorded keying code information via the intra-body communication using the intra-body communication unit of a transmitting terminal further includes:

directly contacting, by the intelligent wearable device, a surface skin of the user.

In one embodiment of the implementation method of the wireless input system based on the intra-body communication, the intelligent wearable device is selected from an intelligent watch, an intelligent wristband and intelligent glasses.

Regarding to the advantages of the present disclosure, the present invention provides a wireless input system based on an intra-body communication and implementation method thereof so that an intelligent wearable device is equipped with a wireless input function. The intra-body communication units are installed in the intelligent wearable device (e.g., an intelligent watch) and a wireless keyboard respectively, where the human body serves as a transmission media of an electronic signal to transmit data information by the human body so that the intelligent wearable device communicates with the wireless keyboard to input text messages in a wireless manner. Furthermore, since the human body transmits the electronic signal while performing an intra-body communication procedure, the intra-body communication procedure has many advantages, such as a minimal electromagnetic noise impact, a low power consumption and a data confidentiality. Moreover, when the users perform the intra-body communication procedure, there is no loss of communication efficiency to avoid the connection inconvenience of a wired communication. When performing the intra-body communication technology to input text messages in the wireless manner, it improves the input efficiency of the intelligent wearable device (e.g., an intelligent watch) equipped with a small screen to increase the convenience of the users. Thus, the wireless input system has a simple structure, a convenient operation, and a better security.

DETAILED DESCRIPTION OF THE PREFERRED EMBODIMENTS

The following embodiments refer to the accompanying drawings for exemplifying specific implementable embodiments of the present invention. It should be noted that the exemplary described embodiments are used to describe and understand the present invention, but the present invention is not limited thereto.

Figure 1:
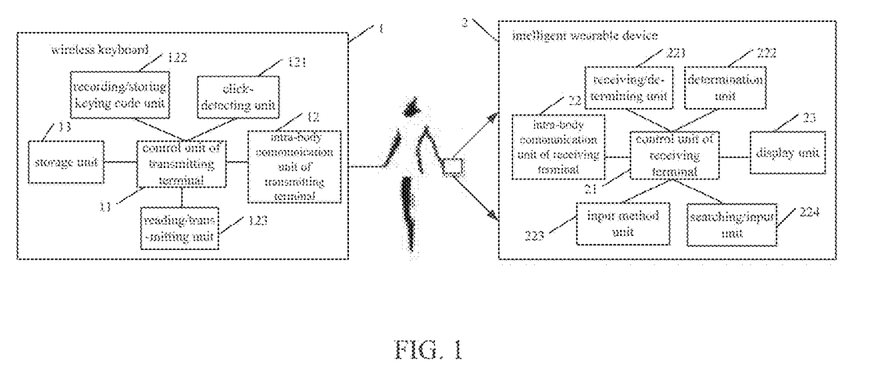
FIG. 1 is an illustrative block diagram of a wireless input system based on an intra-body communication according to one preferred embodiment of the present invention.

The present invention provides a wireless input system based on the intra-body communication where the wireless input system based on the intra-body communication includes two parts of a wireless keyboard 1 and an intelligent wearable device 2.

The wireless keyboard 1 and the intelligent wearable device 2 respectively include an intra-body communication unit of a transmitting terminal 11 and an intra-body communication unit of a receiving terminal 21 for transmitting and receiving data information by an intra-body communication technology. In one embodiment, the intra-body communication unit of the transmitting terminal 11 and the intra-body communication unit of the receiving terminal 21 are intra-body communication units with a plurality of different types which are compatible to the intra-body communication technology, where a human body serves as an information transmission media to communicate each other. In one embodiment, the intra-body communication unit of the transmitting terminal 11 is disposed in a press-button position of the wireless keyboard 1 to directly contact a typing finger of a user. The intra-body communication unit of the receiving terminal 21 directly contacts a skin surface of the human body of the user. Furthermore, the intra-body communication unit of the transmitting terminal 11 and the intra-body communication unit of the receiving terminal 21 are the same or different.

The wireless keyboard 1 further includes a control unit of the transmitting terminal 12 and a storage unit 13. The control unit of the transmitting terminal 12 is a control center of the wireless keyboard 1 to couple to the units within the wireless keyboard 1 for controlling the operations of the units. The storage unit 13 is configured to store a keyboard type information of the wireless keyboard 1 and dynamically store the keying code information when the user presses down the wireless keyboard 1 in real time.

The intelligent wearable device 2 further includes a control unit of the receiving terminal 22 and a display unit 23. The control unit of the receiving terminal 22 is a control center of the intelligent wearable device 2 to couple to the units within the intelligent wearable device 2 for controlling the operations of the units. The display unit 23 is configured to display text messages on the screen of the intelligent wearable device 2.

Persons skilled in the art should be noted that the display unit 23 of the intelligent wearable device 2 is a display screen having single screen (light-emitted diode, LED) or multiple screen LEDs, or different display devices. In other words, the input statuses are displayed on single screen LED or the text messages are inputted to the different multiple screen LEDs by a switching mode between the multiple screen LEDs.

FIG. 1 is an illustrative block diagram of a wireless input system based on an intra-body communication according to one preferred embodiment of the present invention. Persons skilled in the art should be noted that the units within the wireless keyboard 1 and the intelligent wearable device 2 can be modified based on different application fields.

The wireless keyboard 1 is a wireless keyboard which is clicked by the hands of the user. The wireless keyboard 1 serves as an input function. When the wireless keyboard 1 detects that the user hits the keys of the keyboard by the hands, the wireless keyboard 1 records and stores the keying code information corresponding to the keystrokes, and the intra-body communication unit is installed in the wireless keyboard 1 to transmit the keying code information and the keyboard type information of the wireless keyboard 1 via the intra-body communication technology.

In one preferred embodiment, the wireless keyboard 1 further includes the following units.

A click-detecting unit 121 is configured to detect whether the user clicks the wireless keyboard 1 by the hand. If the click-detecting unit 121 does not successfully detect that the user clicks the wireless keyboard 1 by the hand, the click-detecting unit 121 continuously detect the click operations of the user. If the click-detecting unit 121 successfully detects that the user clicks the wireless keyboard 1 by the hand, the wireless keyboard 1 transmits the received instructions, which correspond to the keying code information and the keyboard type information of the wireless keyboard 1, to the intelligent wearable device 2 via the human body, and the intra-body communication unit of the transmitting terminal 11 and the intra-body communication unit of the receiving terminal 21.

A recording and storing keying code unit 122 is configured to record and store the clicked keying code information when the user clicks the wireless keyboard by the hand. When the user clicks the keyboard, the text messages corresponding to the keying code information are recorded in real time, where the text messages may be characters, symbols and digits, and stores the keying code information.

A reading and transmitting unit 123 is configured to read the keying code information and transmits the keying code information and the keyboard type information of the wireless keyboard 1. In other words, after recording and storing keying code information, the reading and transmitting unit 123 acquires the keying code information clicked by the user and the keyboard type information of the wireless keyboard 1 from the storing unit and transmits the keying code information and keyboard type information to the intra-body communication unit of the transmitting terminal 11.

The intelligent wearable device 2 is a smart wearable device, such as an intelligent watch and intelligent glasses, worn by the user. The intelligent wearable device 2 serves as the application and control functions to input text messages, such as a scene-chatting function, a scene-searching function and a text-recording scene. The intelligent wearable device 2 includes the intra-body communication units for receiving the keying code information and the keyboard type information from the wireless keyboard 1 by the intra-body communication technology. When the keyboard type information corresponds to the wireless keyboard 1 inputted by the user and the intelligent wearable device 2 is in an input status, the intelligent wearable device 2 starts simulating the keying code information of keyboard and searches the text messages corresponding to the keying code information by a default input method. In detail, the intelligent wearable device 2 includes the following units.

A receiving and determining unit 221 is configured to receive and analyze the keying code information and the keyboard type information issued by the wireless keyboard 1 and determines whether the analyzed keyboard type information corresponds to the wireless keyboard 1 clicked by the user.

In the intelligent wearable device, such as an intelligent watch, worn by the user, the intra-body communication unit of the receiving terminal 21 acquires the information transmitted by the human body which serves as a transmission conductive media, where the information includes the keying code information, which corresponds to the wireless board 1 clicked by the user, and the keyboard type information. The receiving and determining unit 221 of the intelligent watch analyzes the received information and determines whether the keyboard type information, which is received from the intra-body communication unit of the receiving terminal 21, corresponds to the wireless board 1 clicked by the user.

A determination unit 222 is configured to determine whether the intelligent wearable device 2 is in an input status when the keyboard type information corresponds to the wireless board 1 clicked by the user.

When the receiving and determining unit 221 of the intelligent wearable device 2 (e.g., an intelligent watch) determines that the received the keyboard type information corresponds to the wireless board 1 clicked by the user, the determination unit 222 determines whether the intelligent wearable device 2 is in the input status. In other words, it is determined whether the intelligent wearable device 2, such as an intelligent watch, starts the application and control functions to input text messages, such as a scene-chatting function, a scene-searching function and a text-recording scene.

An input method unit 223 is configured to acquire the keying code information and maps the acquired keying code information to the simulated keying code information when the intelligent wearable device 2 is in the input status.

When the intelligent wearable device 2, such as an intelligent watch, is in the input status, the input method unit 223 acquires the keying code information and maps the acquired keying code information to the simulated keyboard keying code information within the intelligent watch.

A searching and input unit 224 is configured to start an input method mode of the intelligent wearable device 2 based on the simulated keyboard keying code information to search the corresponding text messages for input.

Based on the simulated keyboard keying code information which are mapped to the keying code information by the wireless keyboard 1, the input method mode of the intelligent wearable device 2 starts to search the corresponding text messages for input.

It should be noted that the functions of the units in the present disclosure are not absolute. One or more functions or a portion of a function within the units in the claims can be implemented by one unit or more units. Furthermore, two or more units can be combined together, or one function can be implemented by two units or more units.

Figure 2:
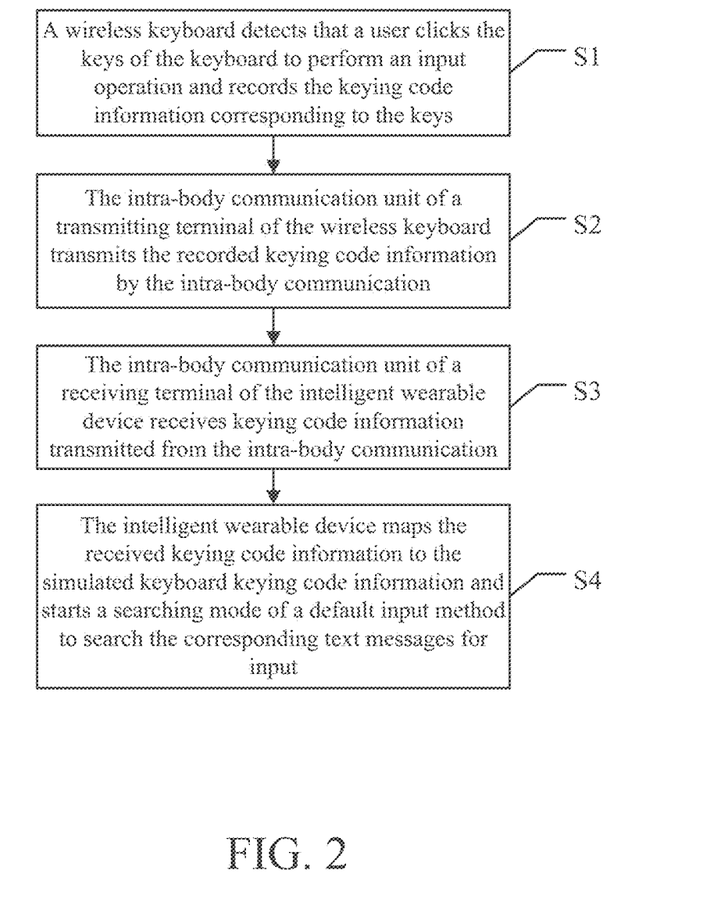
FIG. 2 is a flowchart of an implementation method of the wireless input system based on the intra-body communication according to one preferred embodiment of the present invention.

FIG. 2 is a flowchart of an implementation method of the wireless input system based on the intra-body communication according to one preferred embodiment of the present invention. The implementation method includes the following steps:

in step S1, a wireless keyboard detects that a user clicks the keys of the keyboard to perform an input operation and records the keying code information corresponding to the keys.

in step S2, the intra-body communication unit of a transmitting terminal of the wireless keyboard transmits the recorded keying code information by the intra-body communication.

in step S3, the intra-body communication unit of a receiving terminal of the intelligent wearable device receives keying code information transmitted from the intra-body communication.

in step S4, the intelligent wearable device maps the received keying code information to the simulated keyboard keying code information and starts a searching mode of a default input method to search the corresponding text messages for input.

The step S1 further includes:

in step S11, the wireless keyboard detects that the user clicks the keys of the keyboard and the fingers of the user directly contact the keys of the wireless keyboard.

The step S3 further includes:

in step S31, the intelligent wearable device directly contacts the surface skin of the user.

The intelligent wearable device may be an intelligent watch, an intelligent wristband and intelligent glasses.

According to the above-mentioned descriptions, the present invention provides a wireless input system based on an intra-body communication and implementation method thereof so that an intelligent wearable device is equipped with a wireless input function. The intra-body communication units are installed in the intelligent wearable device (e.g., an intelligent watch) and a wireless keyboard respectively, where the human body serves as a transmission media of an electronic signal to transmit data information by the human body so that the intelligent wearable device communicates with the wireless keyboard to input text messages in a wireless manner. Furthermore, since the human body transmits the electronic signal while performing an intra-body communication procedure, the intra-body communication procedure has many advantages, such as a minimal electromagnetic noise impact, a low power consumption and a data confidentiality. Moreover, when the users perform the intra-body communication procedure, there is no loss of communication efficiency to avoid the connection inconvenience of a wired communication. When performing the intra-body communication technology to input text messages in the wireless manner, it improves the input efficiency of the intelligent wearable device (e.g., an intelligent watch) equipped with a small screen to increase the convenience of the users. Thus, the wireless input system has a simple structure, a convenient operation, and a better security.

In the implementation method of the wireless input system based on the intra-body communication according to one preferred embodiment of the present invention, persons skilled in the art should be noted that at least one computer program controls the related hardware components to perform all or a portion of the steps of the implementation method, where the at least one computer program is stored in a computer readable storage media (e.g., a storage unit of the intelligent wearable device) to be executed by at least one processor within the intelligent wearable device. The procedure of the implementation method includes the aforementioned steps in at least one embodiment, where the computer readable storage media includes a disk drive, an optical disc, read-only memory (ROM) and random access memory (RAM).

In the wireless input system based on an intra-body communication according to one preferred embodiment of the present invention, the functional units are integrated into a processing chip. In one case, each of the functional units are independently formed. In another case, two or more functional units are integrated into one functional unit. The above functional units can be implemented by hardware components or software modules. If the software modules form the functional units to serve as independent products for sale or usage, the software modules are stored in the computer readable storage media, such as a disk, the disk drive, the optical disc, and the ROM.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. A wireless input system based on an intra-body communication wherein the system comprises a storage medium for storing program instructions thereon and a processor connected to the storage medium for executing the program instructions, comprising an intelligent wearable device wherein the wireless input system based on the intra-body communication further comprises a wireless keyboard coupled to the intelligent wearable device by a wireless manner to receive an input information, wherein the wireless keyboard comprises an intra-body communication unit of a transmitting terminal and the intelligent wearable device comprises an intra-body communication unit of a receiving terminal so that the wireless keyboard communicates with the intelligent wearable device therebetween via a human body to perform a wireless input procedure, and wherein the intra-body communication unit of the transmitting terminal is disposed in a press-button position of the wireless keyboard to directly contact a typing finger of a user, and the intra-body communication unit of the receiving terminal is disposed in the intelligent wearable device to directly contact a skin surface of the human body of the user;

the wireless keyboard further comprising a control unit of the transmitting terminal and a storage unit;
wherein the control unit of the transmitting terminal coupled to the intra-body communication unit of the transmitting terminal and configured to cause the processor to control operations of the units within the wireless keyboard;
wherein the storage unit coupled to the control unit of the transmitting terminal stores a type information of the wireless keyboard and dynamically stores a keying code information, and the storage unit further comprises a keying code information storage unit for dynamically stores and records the keying code information; and
the intelligent wearable device further comprising a control unit of the transmitting terminal and a display unit;
wherein the control unit of the receiving terminal coupled to the intra-body communication unit of the receiving terminal and configured to cause the processor to control operations of the units within the intelligent wearable device; and
wherein the display unit coupled to the control unit of the receiving terminal displays text messages on a screen of the intelligent wearable device;
wherein the receiving and determining unit coupled to the control unit of the receiving terminal is configured to cause the processor to receive and analyze the keying code information and the keyboard type information issued by the wireless keyboard and determines whether the analyzed keyboard type information corresponds to the wireless keyboard clicked by the user.

2. The wireless input system based on the intra-body communication of claim 1, wherein the wireless keyboard further comprises a click-detecting unit, a recording and storing keying code unit, and a reading and transmitting unit;
wherein the click-detecting unit coupled to the control unit of the transmitting unit is configured to cause the processor to detect whether the user clicks the wireless keyboard by the hand;
wherein the recording and storing keying code unit coupled to the control unit of the transmitting unit is configured to cause the processor to record and store the clicked keying code information when the user clicks the wireless keyboard by the hand; and
wherein the reading and transmitting unit coupled to the control unit of the transmitting unit is configured to cause the processor to read the keying code information and transmits the keying code information and the keyboard type information of the wireless keyboard.

3. The wireless input system based on the intra-body communication of claim 1, wherein the intelligent wearable device further comprises a receiving and determining unit, a determination unit, an input method unit, and a searching and input unit;
wherein the determination unit coupled to the control unit of the receiving terminal is configured to cause the processor to determine whether the intelligent wearable device is in an input status when the keyboard type information corresponds to the wireless board clicked by the user;
wherein the input method unit coupled to the control unit of the receiving terminal is configured to cause the processor to acquire the keying code information and maps the acquired keying code information to a simulated keying code information when the intelligent wearable device is in the input status; and
wherein the searching and input unit coupled to the control unit of the receiving terminal is configured to cause the processor to start an input method mode of the intelligent wearable device based on the simulated keyboard keying code information to search the corresponding text messages for input.

4. A wireless input system based on an intra-body communication wherein the system comprises a storage medium for storing program instructions thereon and a processor connected to the storage medium for executing the program instructions, comprising an intelligent wearable device wherein the wireless input system based on the intra-body communication further comprises a wireless keyboard coupled to the intelligent wearable device by a wireless manner to receive an input information, wherein the wireless keyboard comprises an intra-body communication unit of a transmitting terminal and the intelligent wearable device comprises an intra-body communication unit of a receiving terminal so that the wireless keyboard communicates with the intelligent wearable device therebetween via a human body to perform a wireless input procedure;

the wireless keyboard further comprising a control unit of the transmitting terminal and a storage unit;

wherein the control unit of the transmitting terminal coupled to the intra-body communication unit of the transmitting terminal and configured to cause the processor to control operations of the units within the wireless keyboard;

wherein the storage unit coupled to the control unit of the transmitting terminal stores a type information of the wireless keyboard and dynamically stores a keying code information; and the intelligent wearable device further comprising a control unit of the transmitting terminal and a display unit;

wherein the control unit of the receiving terminal coupled to the intra-body communication unit of the receiving terminal and configured to cause the processor to control operations of the units within the intelligent wearable device; and wherein the display unit coupled to the control unit of the receiving terminal displays text messages on a screen of the intelligent wearable device;

wherein the determination unit coupled to the control unit of the receiving terminal is configured to cause the processor to determine whether the intelligent wearable device is in an input status when the keyboard type information corresponds to the wireless board clicked by the user.

5. The wireless input system based on the intra-body communication of claim 4, wherein the wireless keyboard further comprises a click-detecting unit, a recording and storing keying code unit, and a reading and transmitting unit;

wherein the click-detecting unit coupled to the control unit of the transmitting unit is configured to cause the processor to detect whether the user clicks the wireless keyboard by the hand;

wherein the recording and storing keying code unit coupled to the control unit of the transmitting unit is configured to cause the processor to record and store the clicked keying code information when the user clicks the wireless keyboard by the hand; and wherein the reading and transmitting unit coupled to the control unit of the transmitting unit is configured to cause the processor to read the keying code information and transmits the keying code information and the keyboard type information of the wireless keyboard.

6. The wireless input system based on the intra-body communication of claim 4, wherein the intelligent wearable device further comprises a receiving and determining unit, a determination unit, an input method unit, and a searching and input unit;

wherein the determination unit coupled to the control unit of the receiving terminal is configured to cause the processor to determine whether the intelligent wearable device is in an input status when the keyboard type information corresponds to the wireless board clicked by the user;

wherein the input method unit coupled to the control unit of the receiving terminal is configured to cause the processor to acquire the keying code information and maps the acquired keying code information to a simulated keying code information when the intelligent wearable device is in the input status; and wherein the searching and input unit coupled to the control unit of the receiving terminal is configured to cause the processor to start an input method mode of the intelligent wearable device based on the simulated keyboard keying code information to search the corresponding text messages for input.

7. The wireless input system based on the intra-body communication of claim 4, wherein the intra-body communication unit of the transmitting terminal is disposed in a press-button position of the wireless keyboard to directly contact a typing finger of a user, and the intra-body communication unit of the receiving terminal is disposed in the intelligent wearable device to directly contact a skin surface of the human body of the user.

8. The wireless input system based on the intra-body communication of claim 5, wherein the storage unit further comprises a keying code information storage unit for dynamically stores and records the keying code information stored by the recording and storing keying code unit.

9. An implementation method of a wireless input system based on an intra-body communication, the method comprising:

detecting, by a wireless keyboard, that a user clicks a plurality of keys of a keyboard to perform an input operation and recording a keying code information corresponding to the keys;

transmitting, by the wireless keyboard, the recorded keying code information via an intra-body communication using an intra-body communication unit of a transmitting terminal;

receiving, by the intelligent wearable device, the keying code information transmitted from the intra-body communication using the intra-body communication unit of a receiving terminal; and mapping, by the intelligent wearable device, the received keying code information to a simulated keyboard keying code information and starting a searching mode of a default input method to search corresponding text messages for input.

10. The implementation method of the wireless input system based on the intra-body communication of claim 9, wherein detecting, by the wireless keyboard, that the user clicks the keys of the keyboard to perform the input operation and recording the keying code information corresponding to the keys further comprises:

detecting, by the wireless keyboard, that the user clicks the keys of the keyboard and directly contacting, by fingers of the user, the keys of the wireless keyboard.

11. The implementation method of the wireless input system based on the intra-body communication of claim 9, wherein transmitting, by the wireless keyboard, the recorded keying code information via the intra-body communication using the intra-body communication unit of a transmitting terminal further comprises:

directly contacting, by the intelligent wearable device, a surface skin of the user.

12. The implementation method of the wireless input system based on the intra-body communication of claim 9, wherein the intelligent wearable device is selected from an intelligent watch, an intelligent wristband and intelligent glasses.

\* \* \* \* \*